US010659919B1

United States Patent
Li et al.

(10) Patent No.: US 10,659,919 B1
(45) Date of Patent: May 19, 2020

(54) SYSTEM AND METHOD FOR AUTOMATED COMMISSIONING OF ONE OR MORE NETWORKS OF ELECTRONIC DEVICES

(71) Applicant: Osram GmbH, Munich (DE)

(72) Inventors: Yang Li, Georgetown, MA (US);
Khadige Abboud, Somerville, MA (US); Sergio Bermudez, Boston, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/296,359

(22) Filed: Mar. 8, 2019

(51) Int. Cl.
*H04W 4/02* (2018.01)
*H04W 64/00* (2009.01)
*G01S 5/02* (2010.01)
*H04B 17/318* (2015.01)
*H04W 84/18* (2009.01)

(52) U.S. Cl.
CPC ........... *H04W 4/023* (2013.01); *G01S 5/0289* (2013.01); *H04B 17/318* (2015.01); *H04W 64/003* (2013.01); *H04W 84/18* (2013.01)

(58) Field of Classification Search
CPC ... H04W 4/023; H04W 64/003; H04W 84/18; H04W 4/80; H04W 4/38; H04B 17/318; G01S 5/14; G01S 5/00; G01S 5/0289; G01S 5/021
See application file for complete search history.

(56) References Cited

U.S. PATENT DOCUMENTS

| | | | |
|---|---|---|---|
| 6,826,162 B2 | 11/2004 | Haines et al. | |
| 7,231,605 B1 | 6/2007 | Ramakesavan | |
| 7,421,466 B2 | 9/2008 | Haines | |
| 8,823,277 B2 | 9/2014 | Chemel et al. | |
| 2012/0036198 A1* | 2/2012 | Marzencki | H04L 61/6081 709/206 |
| 2013/0023282 A1* | 1/2013 | Lin | G01S 5/021 455/456.1 |
| 2013/0170378 A1 | 7/2013 | Ray et al. | |

(Continued)

FOREIGN PATENT DOCUMENTS

| | | |
|---|---|---|
| CN | 101350635 A | 1/2009 |
| CN | 101354435 A | 1/2009 |
| CN | 101873691 A | 10/2010 |

(Continued)

OTHER PUBLICATIONS

Machine Translation of CN105120517A.

(Continued)

*Primary Examiner* — Quoc Thai N Vu
(74) *Attorney, Agent, or Firm* — Yutian Ling

(57) ABSTRACT

Aspects of the present disclosure include methods and systems for the automated commissioning of a network of electronic devices. The locations of large systems of installed electronic devices equipped with wireless communication modules, such as luminaires, light switches, and occupancy sensors, can be rapidly determined by using inter-device distance measurements to calculate the location coordinates of the devices. Increased confidence in the calculated location coordinates can be achieved by comparing the calculated values to an installation plan and assigning the IDs of the specific devices to the location coordinates in the installation plan.

20 Claims, 3 Drawing Sheets

(56) References Cited

U.S. PATENT DOCUMENTS

2018/0054706 A1 2/2018 Kastee et al.

FOREIGN PATENT DOCUMENTS

| CN | 102231912 A | 11/2011 |
| CN | 102231911 B | 2/2014 |
| CN | 105120517 A | 12/2015 |

OTHER PUBLICATIONS

Machine Translation of CN102231911A.
Machine Translation of CN102231912A.
Machine Translation of CN101873691A.
Machine Translation of CN101354435A.
Machine Translation of CN101350635A.
Dokmanic, Ivan, et al., "Euclidean Distance Matrices: Essential Theory, Algorithms and Applications," Aug. 15, 2015, 17 pages, available at https://arxiv.org/pdf/1502.07541.pdf.

\* cited by examiner

SYSTEM AND METHOD FOR AUTOMATED COMMISSIONING OF ONE OR MORE NETWORKS OF ELECTRONIC DEVICES

FIELD OF THE DISCLOSURE

The present disclosure generally relates to the field of electronic device commissioning. In particular, the present disclosure is directed to a system and method for automated commissioning of one or more networks of electronic devices.

BACKGROUND

The commissioning of a system of electrical devices typically includes determining the relative and/or absolute physical locations or coordinates of the devices after the devices have been installed in a space. The location coordinates of installed devices have traditionally been determined manually, for example with the use of hand tools such as measuring tapes, rulers, compasses, laser levels, and so on. A commissioning process using such manual methods can be tedious and time-consuming and the accuracy of the measurement results are prone to human error.

SUMMARY OF THE DISCLOSURE

Various implementations disclosed herein include a method of commissioning a plurality of nodes in a wireless network. The method includes receiving, from the plurality of nodes, inter-node distance measurements that include node identification information (ID) and values corresponding to distances between pairs of the nodes, determining, by a processor, relative positions of the plurality of nodes based on the inter-node distance measurements, receiving anchor node location coordinates for a plurality of anchor nodes, in which the plurality of anchor nodes are a subset of the plurality of nodes, and calculating, by the processor, location coordinates for the plurality of nodes based on the relative positions of the plurality of nodes and the anchor node location coordinates.

In some implementations, the method further includes receiving an installation plan that includes actual location coordinates of the plurality of nodes, comparing, by the processor, the calculated location coordinates to the installation plan location coordinates, and assigning, by the processor, the node IDs to the installation plan location coordinates. In some implementations, the comparing and assigning steps include executing at least one combinatorial optimization algorithm. In some implementations, the method further includes repeatedly performing, by the processor, the determining, calculating, and assigning steps to determine a plurality of assignments of the node IDs to the installation plan location coordinates, and comparing, by the processor, the plurality of assignments to determine a final assignment of node IDs to the installation plan location coordinates. In some implementations, the comparing the plurality of assignments includes executing, by the processor, at least one combinatorial optimization algorithm to resolve conflicts in the plurality of assignments. In some implementations, determining the relative positions of the plurality of nodes includes calculating, by the processor, inter-node distances from the inter-node distance measurements and creating a Euclidean distance matrix (EDM) from the calculated inter-node distances, and the method further includes calculating, by the processor, a reprojected EDM from the installation plan location coordinates augmented with the assignment of node IDs, comparing, by the processor, the EDM to the reprojected EDM, calculating, by the processor, an error estimate for the assignments of the node IDs to the installation plan location coordinates from the comparison of the EDM to the reprojected EDM.

In some implementations, determining the relative positions of the plurality of nodes includes calculating, by the processor, inter-node distances from the inter-node distance measurements and creating a Euclidean distance matrix (EDM) from the calculated inter-node distances. In some implementations, calculating the location coordinates for each of the plurality of nodes includes reconstructing, by the processor, the location coordinates from the EDM by determining at least one scaling factor from the anchor node location coordinates and applying the at least one scaling factor to the EDM. In some implementations, the inter-node distance measurements are received signal strength indicator (RSSI) values from wireless messages exchanged between pairs of the nodes. In some implementations, the method further includes executing, by the processor, a signal path loss model to calculate estimated inter-node distances from the inter-node distance measurements. In some implementations, the plurality of nodes include a plurality of luminaires each having a communication module configured for inter-luminaire wireless communication.

Further implementations disclosed herein include a computing device. The computing device includes a communications module configured to receive, from a plurality of nodes of a wireless network, inter-node distance measurements that include node identification information (ID) and values corresponding to distances between pairs of the nodes, and a processor coupled to the communications module and configured to determine relative positions of the plurality of nodes based on the inter-node distance measurements, receive anchor node location coordinates for a plurality of anchor nodes, in which the plurality of anchor nodes are a subset of the plurality of nodes, and calculate location coordinates for the plurality of nodes based on the relative positions of the plurality of nodes and the anchor node location coordinates.

In some implementations, the processor is further configured to receive an installation plan that includes actual location coordinates of the plurality of nodes, compare the calculated location coordinates to the installation plan location coordinates, and assign the node IDs to the installation plan location coordinates. In some implementations, the compare and assign steps include executing at least one combinatorial optimization algorithm. In some implementations, the processor is further configured to repeatedly perform the determine, calculate, and assign steps to determine a plurality of assignments of the node IDs to the installation plan location coordinates, and compare the plurality of assignments to determine a final assignment of node IDs to the installation plan location coordinates. In some implementations, the processor is configured to execute at least one combinatorial optimization algorithm to resolve conflicts in the plurality of assignments. In some implementations, determining the relative positions of the plurality of nodes includes calculating inter-node distances from the inter-node distance measurements and creating a Euclidean distance matrix (EDM) from the calculated inter-node distances, and the processor is further configured to calculate a reprojected EDM from the installation plan location coordinates augmented with the assignment of node IDs, compare the EDM to the reprojected EDM, and calculate an error estimate for the assignments of the node IDs to the installation plan location coordinates from the comparison of the EDM to the reprojected EDM.

In some implementations, determining the relative positions of the plurality of nodes includes calculating inter-node distances from the inter-node distance measurements and creating a Euclidean distance matrix (EDM) from the calculated inter-node distances. In some implementations, calculating the location coordinates for each of the plurality of nodes includes reconstructing the location coordinates from the EDM by determining at least one scaling factor from the anchor node location coordinates and applying the at least one scaling factor to the EDM. In some implementations, the inter-node distance measurements are received signal strength indicator (RSSI) values from wireless messages exchanged between pairs of the nodes. In some implementations, the processor is further configured to execute a signal path loss model to calculate estimated inter-node distances from the inter-node distance measurements. In some implementations, the plurality of nodes include a plurality of luminaires each having a communication module configured for inter-luminaire wireless communication.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
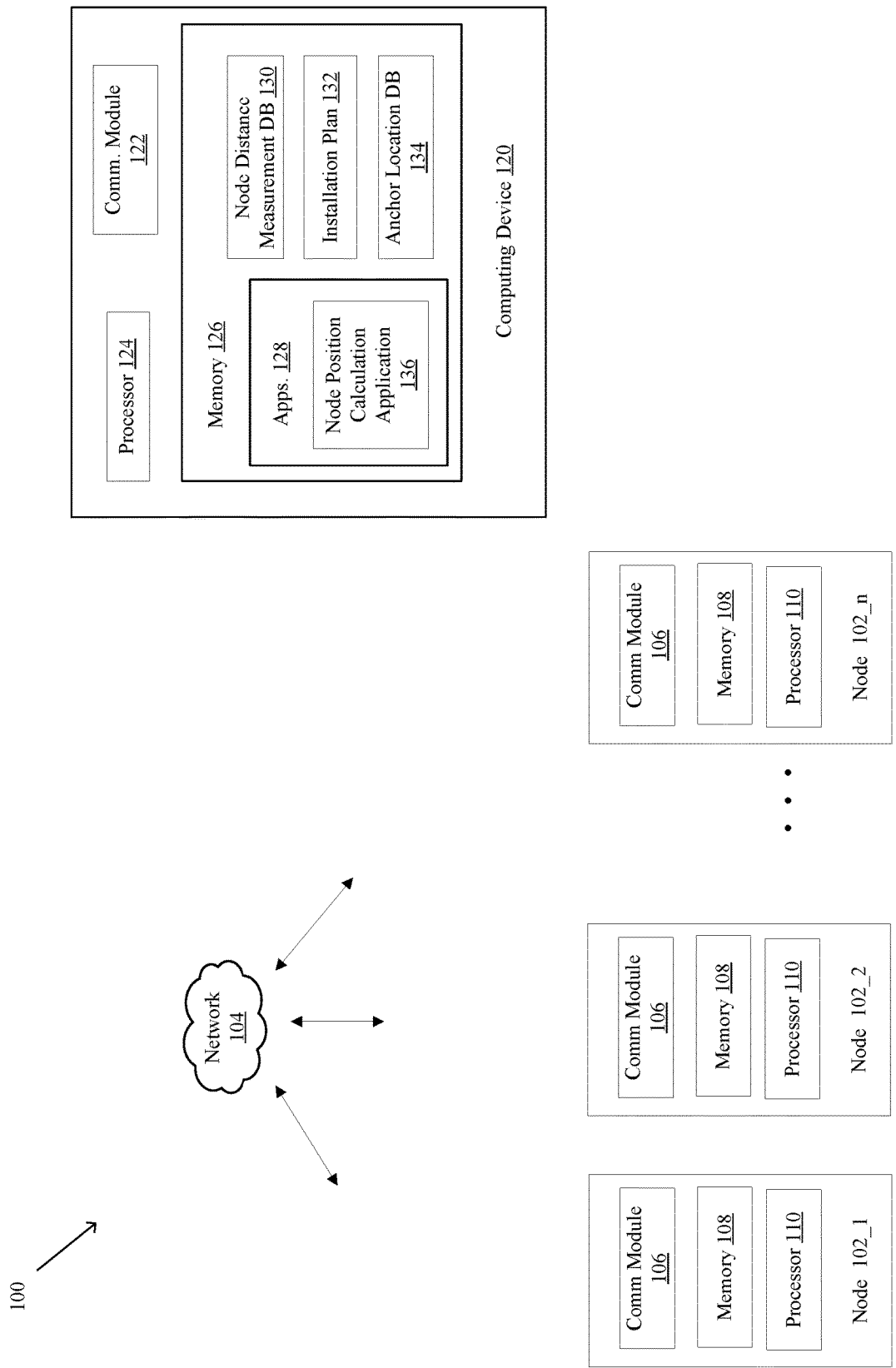
FIG. 1 is a functional block diagram of an example system that includes a network of nodes that have been installed in a space and a computing device in communication with one or more of the nodes and that is configured to automatically determine location coordinates of the nodes.

Aspects of the present disclosure include methods and systems for the automated commissioning of one or more networks of electronic devices. The locations of large systems of installed electronic devices equipped with wireless communication modules, such as luminaires, light switches, and occupancy sensors, can be rapidly determined by using inter-device distance measurements to calculate the location coordinates of the devices. In some examples, installed devices, referred to herein as nodes, may be configured to communicate over a wireless mesh network and exchange messages among themselves that include distance measurement information, for example, a received signal strength indicator (RSSI). Inter-node distances may be estimated from the RSSI values, from which euclidean distance matrices (EDM) can be developed and node location coordinates reconstructed by reference to known location coordinates for a subset of the nodes, referred to herein as anchor nodes. Increased confidence in the calculated node location coordinates can be achieved by comparing the calculated values to an installation plan and assigning the IDs of the specific devices to the location coordinates in the installation plan. Aspects of the present disclosure also include techniques for reconstructing node location coordinates despite noisy and missing inter-node distance measurements and for calculating error metrics for the final commissioning result.

Determining the location coordinates of networks of electronic devices installed in a building, the process referred to in the art as a commissioning process, can provide a variety of benefits, for example, benefits in the areas of security, indoor positioning, space utilization, and network optimization. For example, in the area of security, fully commissioned and mapped wireless networks can have the capability to estimate the location of origin of any wireless signal/packet being transmitted by some radio devices. In this case, network security can be enhanced proactively by maintaining a database of originally commissioned devices and detecting any intruding devices. For example, preventing man-in-the-middle attacks by estimating/confirming the physical origin of a wireless signal/packet. In the area of indoor positioning, the network of radio devices can provide the capability of locating other stationary or moving radio devices in the vicinity embedded into smart phones, smart watches, vehicles, assets, tags, etc. For space utilization, in the case the radio devices embedded into sensors that can sense human occupancy within a building environment, because the locations of the sensors and the contained radio devices are known from the commissioning process, one can derive the space utilization within a building environment from the sensor data. And for network optimization, based on the geolocations and relative positions of the commissioned radio devices, certain functionalities of each individual radio device can be dynamically derived or modified such that an overall network configuration is more suitable for a particular case and/or to improve the efficiency, effectiveness, and robustness of the wireless network. For example, in a mesh network, based on the actual locations of the network nodes, the network could determine or configure an appropriate amount of repeaters or relays used to relay wireless packets from one side of the network to the other. Physical locations of the nodes may be utilized to strategically configure a subset of the nodes as relays to reduce network traffic while maintaining high connectivity and reliability.

FIG. 1 illustrates an example system 100, which includes a plurality of nodes, e.g., "n" number of nodes 102_1, 102_2, . . . 102_n, communicatively coupled over a communication network 104. Each node 102 is a device that has been installed in a space, such as a home or commercial building, and that includes a communication module 106 for communicating with other nodes 102, e.g. over network 104. Non-limiting examples of nodes 202 include virtually any device with an embedded communication module 106, such as any type of sensor, such as an occupancy sensor, RF beacon devices, luminaire switches, luminaires, smartphones, vehicles, smart devices, and computers, etc. As described more below, inter-node communications or measurements may be utilized to automatically determine the physical locations, also referred to herein as the physical coordinates, of the nodes.

In the illustrated example, each node 102 include a communication module 106 that may be configured for wired (e.g., Universal Serial Bus or USB, Ethernet, FireWire, etc.) and/or wireless (e.g., Wi-Fi, Bluetooth, ZigBee etc.) communication, as desired. In accordance with some embodiments, communication module 106 may include a wireless radio configured to act as a transceiver and transmit and receive wireless messages to and from other nodes 102 within its communication range. Communication modules 106 may be configured to communicate locally and/or remotely utilizing any of a wide range of wired and/or wireless communications protocols, including, for example, a digital multiplexer (DMX) interface protocol, Wi-Fi, Bluetooth, digital addressable lighting interface (DALI), ZigBee, Thread, LoRa, Ultra-wideband and/or a combination of any one or more thereof. Any suitable communications protocol, wired and/or wireless, standard and/or custom/proprietary, may be utilized by communication module 106, as desired for a given target application or end-use. In some instances, communication module 106 may be configured for inter-node communication between nodes 102. Communication module 106 may be configured to use any suitable wired and/or wireless transmission technologies (e.g., radio frequency, or RF, transmission; infrared, or IR, light modulation; etc.), as desired for a given target application or end-use. Other suitable configurations for communication module 106 will depend on a given application and will be apparent in light of this disclosure.

Example nodes 102 may include memory 108 and one or more processors 110. Memory 108 can be of any suitable type (e.g., RAM and/or ROM, or other suitable memory) and size, and in some cases may be implemented with volatile memory, non-volatile memory, or a combination thereof. A given processor 110 may be configured to perform operations associated with a given node 102 and one or more of the modules/applications/programs/routines thereof (e.g., within memory 108). The one or more modules stored in memory 108 can be accessed and executed, for example, by the one or more processors 110 of node 102. In accordance with some embodiments, a given module of memory 108 can be implemented in any suitable standard and/or custom/ proprietary programming language, such as, for example C, C++, objective C, JavaScript, and/or any other suitable custom or proprietary instruction sets. The modules of Memory 108 can be encoded, for example, on a machine-readable medium that, when executed by a processor 110, carries out the functionality of a node 102. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. The functional modules of memory 108 (e.g., one or more applications) can be implemented in hardware, software, and/or firmware, as desired for a given target application or end-use.

Network 104 can be any suitable public and/or private communications network. For instance, in some cases, network 104 may be a private local area network (LAN) and may be in communication with a wide area network (WAN), such as the Internet. In some cases, network 104 may include one or more second-generation (2G), third-generation (3G), fourth-generation (4G), and/or fifth-generation (5G) mobile communication technologies. In some cases, network 104 may include a wireless local area network (WLAN) (e.g., Wi-Fi wireless data communication technologies). In some instances, network 104 may include Bluetooth wireless data communication technologies. In some cases, network 104 may include supporting infrastructure and/or functionalities, such as a server and a service provider. In some instances, nodes 102 may be configured for communication with network 104 and one or more of the other nodes 102. Any of a variety of wireless network topologies may be used. In one example, nodes 102 may be configured in a wireless mesh network such that the nodes can directly communicate wireless messages among themselves.

System 100 also includes a computing device 120 that may include a communication module 122 for wired or wireless communication with one or more nodes 102. Computing device may include one or more processors 124, and a memory 126. Memory 126 can be any suitable type (e.g., RAM and/or ROM, or other suitable memory) and size, and in some cases may be implemented with volatile memory, non-volatile memory, or a combination thereof. In some cases, Memory 126 may be configured to be utilized, for example, for processor workspace (e.g., for one or more processors 124) and/or to store media, programs, applications, and/or content on a temporary or permanent basis. Computing device 120 may be a cloud-based service, or a local computing device or a combination thereof.

Referring again to nodes 102, in accordance with some embodiments, the communication module 106, processor 110, and/or memory 108 of one or more of the nodes 102 may be configured to measure and record one or more inter-node distance measurements that directly or indirectly represent a distance between pairs of the nodes 102. For example, one or more of communication modules 106 may be configured to communicate with a communication protocol such as Bluetooth or ZigBee, where a received signal power $P\_r$ is represented and measured by the communication protocol stack as the packet Received Signal Strength Indicator (RSSI), for example, in units of dBm. As described more below, computing device 120 may be configured to apply one or more path loss models to determine an estimated inter-node distance from the received signal power value. Other forms of distance measurements that nodes 102 may be configured to perform include round trip times (RTT), time of arrival (ToA), or time of flight (ToF), etc. In some examples, distance measurements between nodes 102 may be measured using light sensors or ultrasonic waves.

In one example, nodes 102 may be configured to record inter-node distance measurements, such as RSSI or any of the other distance measurement types described herein, in memory and transmit the distance measurements to computing device 120 either directly, or through one or more other nodes 102 in communication with the computing device. In one example, each node 102, for example, each node installed in a building, may be configured to attempt to record inter-node distance measurements, such as RSSI, between itself and every other node 102 or other wireless radio device within communication range of the node. Each node 102 may be configured to directly transmit the distance measurements to computing device for storage in, for example, a node distance measurement database 130 of the computing device 120 for further processing and analysis.

Inter-node distance measurements generated by nodes 102 and received by computing device 120 may include measurements for the same distance measured in both directions. For example, an RSSI value or other distance measurement for a signal sent by node 102_1 and received by node 102_2 and an RSSI value or other distance measurement for a signal sent by node 102_2 and received by node 102_1. Processor 124 of computing device 120 may be configured to record all pairwise inter-node distances between nodes 102 in node distance measurement database 130. In one example, node distance measurement database 130 may be pre-populated with identification information for each node 102 that has been installed. For example, in the case of n number of nodes, node distance measurement database 130 may include $n*(n-1)/2$ number of fields for storing each possible inter-node pairwise distance. One or more distance measurements for each possible pair of nodes 102 and in each direction (e.g. from node 102_1 to 102_2 and from 102_2 to 102_1, etc.) may be taken and sent to computing device 120 and averaged or otherwise processed by processor 124, or averaged or otherwise processed locally by each processor 110 of nodes 102 and the average sent from the nodes to the computing device, or some combination thereof.

In some examples, distance measurements may be under-inclusive. For example, while each node 102 may be configured to measure and transmit a distance measurement between itself and every other node 102 installed within a space, due to, for example, radio frequency signal losses when traveling across a distance, or other sources of signal attenuation, or if some nodes are out of range of other nodes, some nodes may not be able to pick up a transmitted radio signal from other nodes located at a far distance. As a result, in some examples, system 100 may not be able to measure and collect all possible distance measurements between all possible pairs of nodes 102. In one example, the methods disclosed herein may be used to determine the physical locations of the nodes 102 despite such missing data. In one example, the inventors have observed that accurate results may be obtained with the methods disclosed herein when up to 25% of all possible pairwise distance measurements are missing.

In some examples, distance measurements may also be over-inclusive. For example, nodes 102 may be configured to record distance measurements, such as RSSI values for all radio signals they receive and transmit those measurements to computing device 120, including radio signals from wireless devices that are not part of system 100, such as a signal from an occupant's cell phone, or a signal originating from outside of the building where system 100 is installed. In one example, as noted above, node distance measurement database 130 may be pre-populated with identification information, such as serial numbers, for each node 102 that has been installed and processor 124 may be configured to disregard any distance measurements from nodes 102 that are between a node 102 and a radio device that is not part of system 100. In another example, each node 102 may be configured with a unique system identifier that indicates it is one of the nodes 102 installed in system 100 and processor 124 may be configured to disregard any distance measurement that does not include the unique system identifier.

Referring again to computing device 120, as shown in FIG. 1, memory 126 of the computing device may also include an installation plan 132 (or the computing device may otherwise have access to the installation plan stored elsewhere) that provides actual location information where each of nodes 102 are installed. Installation plan 132 may include the location coordinates, e.g. two dimensional or three dimensional, and for example, Cartesian coordinates, of each node 102, which may be absolute with respect to a reference point, and/or relative coordinates. In one example, installation plan 132 is basically a digital blueprint of where nodes 102 are installed in a building, but the installation plan does not include the specific identification information of the specific nodes 102 that were installed. For example, nodes 102 have been installed in a building according to the predetermined installation plan 132 but the unique IDs of the specific node devices actually installed at each location were not recorded during installation. Instead, nodes 102 and computing device 120 may be configured to automatically reconstruct the location coordinates where each node 102 is installed and compare the reconstructed locations to the installation location coordinates and assign the node IDs to the installation plan location coordinates. As described more below, computing device 120 may be configured to calculate the location coordinates of each node 102 from the node distance measurements received from the nodes, and then compare the reconstructed coordinates to the installation plan 132 to verify the position calculation and assign the ID of each node 102 to the node locations defined by the installation plan. In other examples, computing device 120 may be configured to calculate the location coordinates of each node 102 from the node distance measurements received from the nodes without reference to an installation plan such as installation plan 132.

Memory 126 of computing device 120 may also include an anchor location database 134, which includes the location coordinates for a subset of nodes 102, referred to herein as anchor nodes, as well as the IDs of the installed anchor nodes. For example, after nodes 102 have been installed, some other measurement technique known in the art, such as the manual measurement techniques described in the background section above, may be used to measure the actual locations of the anchor nodes. In cases where installation plan 132 is available, instead of or in addition to anchor location database 134, installation plan 132 may be updated to include the IDs of the installed anchor nodes. For example, the IDs of specific devices of a relatively small subset of the total number of nodes 102 of system 100 may be recorded or otherwise noted during installation, thereby providing the actual location of those installed anchor nodes. As described more below, knowledge of the anchor node locations may be used by computing device 120 to reconstruct node location coordinates from the node distance measurements received from the nodes. In one example, anchor location database includes the location coordinates for at least three, and in some examples, at least four of the nodes 102.

Memory 126 of computing device 120 may also contain software applications 128, which may include a node position calculation application 136. As described more below, node position calculation application 136 may include instructions for causing processor 124 to receive distance measurements between pairs of nodes 102, coordinates of anchor nodes, and in some examples, an installation plan, and determine the location coordinates of each of nodes 102 to thereby commission the installation of the nodes 102.

Figure 2:
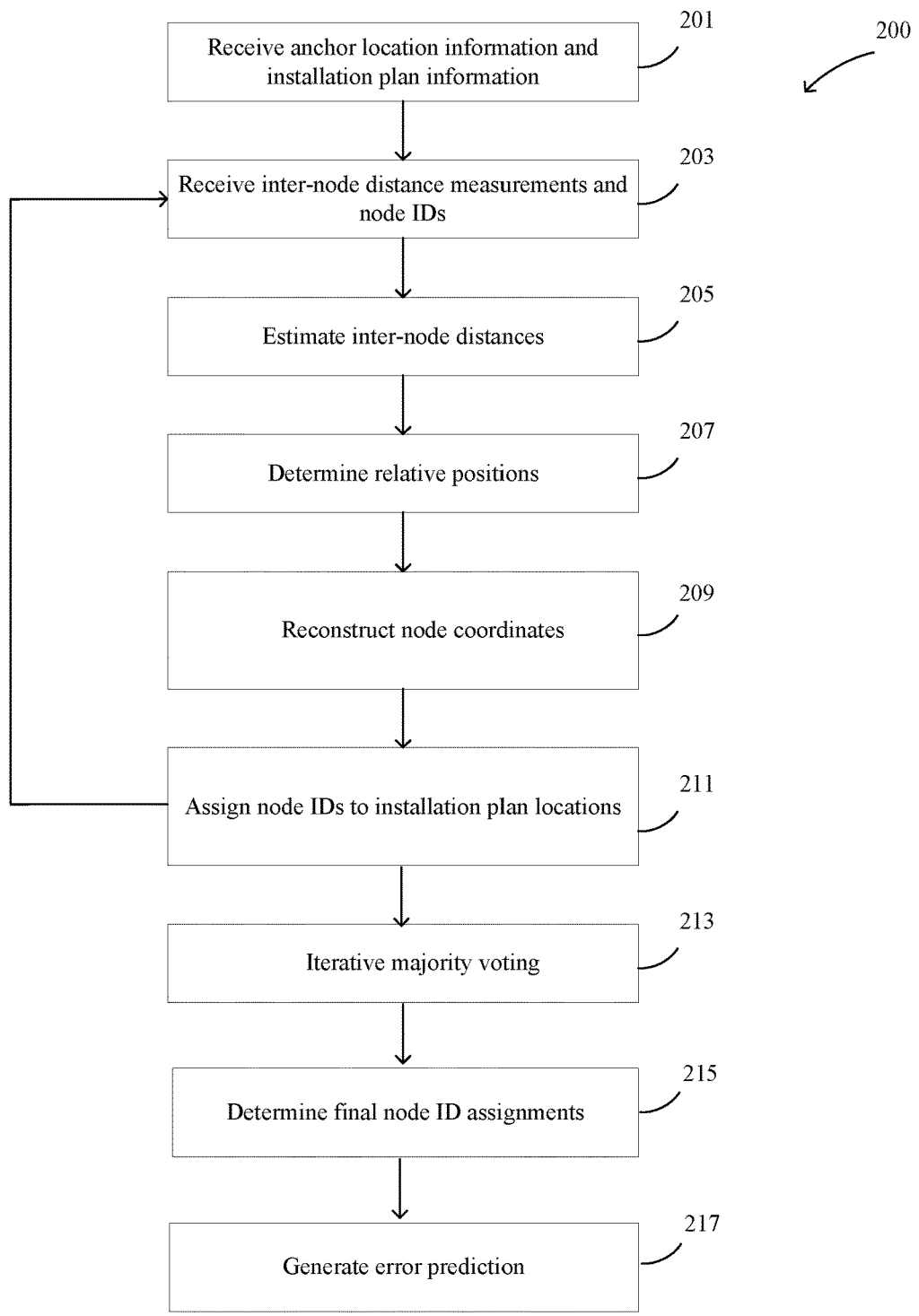
FIG. 2 is an example method for determining location coordinates of an installation of nodes.

FIG. 2 illustrates one example method 200 for determining location coordinates of an installation of nodes, e.g., nodes 102 of a wireless network, e.g., network 104, using a computing device, e.g., computing device 120. In block 201, the computing device may receive anchor location information and installation plan information and store the information in memory, e.g., installation plan 132 and anchor location database 134 of memory 126. As described above, anchor location information may refer to the location coordinates of a subset of the nodes of a wireless network for which the node ID and location coordinates are known. Installation plan information may be a digital blueprint for the installation of the nodes and include location coordinate information for the installation of nodes that have been installed and that are being commissioned, except that the installation plan does not include the IDs of the specific devices actually installed. As noted above, in some examples, a computing device may be configured to determine the location coordinates of a plurality of installed nodes without referring to or accessing an installation plan.

In block 203, the computing device may receive inter-node pairwise distance measurements and the two node IDs associated with each pairwise distance measurement from the plurality of installed nodes. As described above, any of a variety of pairwise distance measurements may be received, such as RSSI, RTT, ToA, ToF, light sensor measurements, or ultrasonic wave transceiver measurements. As also noted above, the computing device may store the received distance measurements in memory, for example, in node distance measurement database 130, and due to a variety of factors, the computing device may not receive a distance measurement between each possible pair of nodes in an installation.

In block 205, the computing device may use the received inter-node distance measurements as inputs to calculate an estimated distance between each pair of nodes. For example, node position calculation application 136 may include instructions for executing a signal path loss model to estimate distances from RSSI values received from the nodes. As described more below, RSSI values typically contain noise that affects the accuracy of the distance calculation, which is addressed with the algorithms disclosed herein.

In block 207, the computing device may be configured to use the estimated distances determined in block 205 to determine relative position information that defines the relative positions between each pair of nodes 102. In one example, node position calculation application 136 may include instructions for computing a Euclidean Distance Matrix (EDM) from the estimated distances determined in block 205. As is known in the art, the elements of an EDM matrix D is defined as the squared distances among the points, which in the illustrated example, are the node locations. As described more below, the computing device may be configured to determine an EDM by applying a multidimensional scaling (MDS) algorithm. For example, When the EDM matrix D is measured as $\hat{D}$, an estimated Gram matrix $\hat{G}$ may be obtained as $\hat{G}=-(\hat{D}-ed_1^T-d_1e^T)/2$, where e is a column vector of all ones, $d_1$ is the first column vector of $\hat{D}$, and the superscript T denotes the transpose operation on a vector. Once the estimated Gram matrix is obtained, an estimation of all the relative node locations can also be derived.

Node position calculation application 136 may also include instructions for calculating the known distances between anchor nodes, for example, from the location coordinates of the anchors stored in anchor location database 134. Node position calculation application 136 may also include instructions for modifying the estimated EDM obtained from the node distance measurements, e.g., RSSI measurements, by correcting the corresponding distance squared values in the EDM among the anchors.

When an installation plan is available, e.g., installation plan 132, node position calculation application 136 may also include instructions for applying constraints on the entries in the EDM so as to not exceed the minimum and maximum possible distances among the installed nodes 102 of the system 100. For example, the node position calculation application 136 may include instructions for finding the minimum and maximum distances among non-anchor nodes and limiting or constraining the corresponding values in the EDM. In another example, constraints on the minimum and maximum distances between anchor and non-anchor nodes may also be applied to the EDM.

In block 209, the computing device may be configured to use the EDM matrix determined in block 207 to reconstruct the location coordinates of the nodes. In one example, as is known in the art, absolute position and orientation of the nodes is lost when finding a feasible point set of the node locations from a measured EDM matrix because an EDM matrix only contains relative position information. In one example, the computing device may be configured to determine absolute position and orientation information from the EDM calculated in block 207 by rotating and scaling the EDM matrix values according to a subset of known node coordinates, for example, the anchor location coordinates stored in anchor location database 134. Node position calculation application 136 may include instructions for determining rotation, translation, and scaling factors, to rotate, translate and scale the EDM matrix to align with the known anchor location coordinates. Application of such scaling factors are sometimes referred to in the art as a statistical shape analysis or Procrustes analysis. Node position calculation application 136 may include instructions for applying the calculated rotation, translation, and scaling factors to the estimated relative node locations determined at block 207 to find absolute position information for each node, e.g., the location coordinates of each node. In examples where an installation plan is available, e.g., installation plan 132, the location coordinates determined in block 209 may be calculated with respect to the same reference point as the coordinates in the installation plan. As described more below, distance measurements made by nodes may be noisy and there could be missing entries in a measured EDM, e.g., an EDM generated in block 207. In such cases, directly calculating absolute node locations by performing a node point set reconstruction can be challenging. In some examples, block 209 may also include executing one or more semidefinite relaxation algorithms for reconstructing the node location coordinates despite noisy and missing data.

In block 211, in examples where the computing device has access to an installation plan, such as installation plan 132, node position calculation application 136 may include instructions for comparing the node location coordinates calculated in block 209 to the installation plan node location coordinates and assigning the IDs of the installed nodes to the node location coordinates in the installation plan that are in closest agreement to the calculated locations. In one example, the node position calculation application 136 may include instructions for executing a combinatorial optimization algorithm that solves an assignment problem for assigning the calculated node positions to the installation plan positions. In one example, the node position calculation application 136 may include instructions for executing a combinatorial optimization algorithm known as the Hungarian algorithm.

As indicated in FIG. 2, blocks 203 to 211 may be repeated several times to repeatedly calculate the location coordinates of the installed nodes and compare the calculated coordinates to the installation plan coordinates to assign the node IDs to the installation plan coordinates. The results of each iteration can be stored in memory, e.g., memory 126, and further processed to minimize errors in the calculation and identify location coordinate calculations and node ID assignments that may be inaccurate. In block 213, the plurality of calculated location coordinates and node ID assignments may be collected and compared to converge on the most likely correct answer. In one example, at block 213, node position calculation application 136 may include instructions for performing an iterative two-level majority voting algorithm. The first level majority voting is described above in block 211, where at each iteration, the calculated node location coordinates are compared to the installation plan coordinates to make an assignment of node IDs. At block 213, a second level of majority voting may be performed, where the assignments of node IDs to installation plan coordinates performed at each iteration of blocks 203 to 211 are compared and the assignments that are in the most agreement across the plurality of iterations may be selected. In one example, in the event of a conflict where the first level majority voting indicates the same node ID could be in two different locations, node position calculation application 136 may include instructions for performing a second combinatorial optimization algorithm such as the Hungarian algorithm to determine the assignment.

At block 215, the computing device may be configured to use the iterative majority voting performed at block 213 to determine a final assignment of node IDs to actual locations, for example, locations specified in an installation plan. The computing device may be configured to determine it has reached a final answer in any of a variety of ways, such as when a percentage of the node ID assignments in a given iteration of blocks 203 to 211 are in agreement for a minimum number of iterations, or after some maximum number of iterations of blocks 203 to 211 has been reached.

At block 217, the computing device may also be configured to perform an error prediction for the assignment of each node. For example, the error prediction can correspond to the number of iterations of blocks 203-211 where the majority voting in block 213 was in agreement with a final assignment. Node position calculation application 136 may include instructions for assigning a higher error value to final node ID assignments having a lower number of iterations in agreement. In one example, as described more below, node position calculation application 136 may include instructions for creating a reprojected EDM from the final commissioning result, which in some examples is the installation plan location coordinates augmented with the assigned node IDs, and comparing the reprojected EDM to the observed EDM created in block 207 and a reprojection error vector can be calculated that describes element-wise discrepancies between the two EDMs. In some examples, the error prediction may be used to identify a subset of nodes 102 where a follow-up measurement, such as one of the prior art manual measurements described in the background section, above, should be performed.

Example Implementation Details

The following provides further implementation details for configuring a computing device to perform method 200, including example mathematical models and associated derivations, which may be used to develop a node position calculation application, such as node position calculation application 136.

Example Implementation of Block 205—Path-Loss Modeling

As noted above, in block 205, when the distance measurements received from nodes 102 are RSSI values, node position calculation application 136 may include instructions for executing a signal path loss model to estimate distances corresponding to the RSSI values. When a wireless signal traverses through a wireless communication channel, it attenuates and the received power at a receiver can be calculated as:

$$P_r = P_t + 20\log_{10}\frac{c}{4\pi d_0 f_c} - 10\gamma\log_{10}\frac{d}{d_0}, \quad \text{Eq. (1)}$$

In which:
$P_r$ is the received power measured in units of dBm;
$P_t$ is the transmitted power with unit of dBm;
c is the speed of light
$f_c$ is the carrier frequency of the signal;

$d_0$ is the reference distance;
d is the distance between the receiver and the transmitter; and
$\gamma$ is the path-loss exponent.

The path-loss $P_L$ is then defined as $P_L=P_t-P_r$ in dBm. Due to scattering phenomena in the node antenna's near-field, this computation is only valid at transmission distances $d>d_0$, where $d_0$ can be typically assumed to be in the range of 1 to 10 meter(s) indoors and 10 to 100 meters outdoors.

In wireless communication protocols such as Bluetooth and ZigBee, the received signal power $P_r$ is often represented and measured by the communication protocol stack as the packet Received Signal Strength Indicator (RSSI) in units of dBm. According to the model in Equation (1), the distance between a transmitter and a receiver can be estimated given other parameters such as the received signal power, the transmitted power, the reference distance, and the path-loss exponent. In practice, the knowledge of the exact transmitter power may not always be readily available. An alternative is to consider a reference received power to encapsulate the transmitter power as discussed below.

Reference Received Power and Distance $P_r^0$ is the reference received power. It is defined as the received power by a receiver at the reference distance $d_0$:

$$P_r^0 = P_t + 20\log_{10}\frac{c}{4\pi d_0 f_c} - 10\gamma\log_{10}\frac{d_0}{d_0} \quad \text{Eq. (2)}$$
$$= P_t + 20\log_{10}\frac{c}{4\pi d_0 f_c}.$$

From Equations (1) and (2):

$$P_r = P_r^0 - 10\gamma\log_{10}\frac{d}{d_0}. \quad \text{Eq. (3)}$$

As a result, to find the distance d between a receiver and a transmitter, one may use Equation (4):

$$d = d_0 10^{\frac{P_r^0 - P_r}{10\gamma}}. \quad \text{Eq. (4)}$$

Note that in order to estimate a distance based on a received power $P_r$, the reference received power $P_r^0$ and the pass-loss exponent y should be estimated beforehand and may be stored in memory, e.g., memory 126.

Estimation of Reference Received Power

In order to estimate $P_r^0$, one may place a radio receiver of a node, e.g., node 102, at a fixed distance of $d_0$ away from a transmitter and record received power values while changing the locations and orientations of both transmitter and receiver. The sample mean can then be used as an estimation of the reference received power. With Bluetooth technology, for example, the channels may be varied while measuring the received power values.

Estimation of Path-Loss Exponent

The value of $\gamma$ depends on the propagation environment. For propagations that approximately follow a free-space or two-ray model, $\gamma$ is usually set to 2. For most common cases, including indoor and outdoor environments, the value of $\gamma$ is often within the range from 1.6 to 6.5. Tables of typical values in various environments are available. See, e.g., A.

Goldsmith, Wireless Communications. New York, N.Y., USA: Cambridge University Press, 2005.

Within a relatively homogeneous environment, once the reference received power is estimated, the value of γ can be estimated by using Equation (4), along with their known locations and corresponding inter-node distances, the received powers, and the estimated reference received power.

γ may be estimated using a minimum mean squared error (MMSE) optimization problem as shown in Equation 5:

$$\hat{\gamma} = \arg\min_\gamma \Sigma_{i \in \{1,\ldots,n\}} [d_{measured}(i) - d_{model}(i,\gamma)]^2, \quad \text{Eq. (5)}$$

in which:

$\hat{\gamma}$ is the estimated value of γ;

n is the total number of measurements;

i is the index of a measurement;

$d_{measured}(i)$'s are the measured distances between the nodes via traditional means, and $$d_{model}(i, \gamma) = d_0 10^{\frac{P_r^0 - P_r(i)}{10\gamma}},$$

s are the corresponding distances derived with Equation (4) with $P_r(i)$ being the measured received power for the i-th measurement.

Alternatively, one may set up the same optimization problem in a different form as shown in Equation (6):

$$\hat{\gamma} = \arg\min_\gamma \Sigma_{i \in \{1,\ldots,n\}} [P_{L,measured}(i) - P_{L,model}(d_{measured}(i),\gamma))]^2 \quad \text{Eq. (6)}$$

in which:

$P_{L,measured}(i) = P_t(i) - P_r(i)$ and is the measured path-loss; and $$P_{L,model}(d_{model}(i, \gamma)) = -20\log_{10}\frac{c}{4\pi d_0 f_c} + 10\gamma\log_{10}\frac{d_{measured}(i)}{d_0}$$

is the path-loss calculated by the model.

In this alternative form, the derivatives with respect to γ and its optimal solution may be determined.

Example Implementation of Block 207—Euclidean Distance Matrices and Points set Reconstruction Referring again to FIG. 2, as noted above, in block 207, the computing device may include instructions for computing a Euclidean Distance Matrix (EDM) based on the calculated relative distances. One example implementation for performing such a calculation is as follows:

For ease of understanding and relatively simpler algebraic manipulations, the following conventions are used in this section:

Matrices are in boldface and capital letters: X.

Vectors are in boldface and small letters: γ.

Each column of the data matrix contains one data vector.

A column vector of all ones is denoted by e, with specified dimensions.

Dimensionality in subscripts of matrices and vectors are dropped whenever it is clear.

Considering a collection of n points (e.g., an "n" number of installed nodes 102 in system 100) in a d-dimensional Euclidean space, we denote by $X \in \mathbb{R}^{d \times n}$ the matrix of the coordinates of the points set, such that $$X_{d \times n} = [x_1, x_2, \ldots, x_n], \quad \text{Eq. (7)}$$

in which:

$x_i \in \mathbb{R}^d$ is a column vector describing d-dimensional coordinate of the i-th point.

The squared distance $d_{i,j}^2$ between the i-th and j-th points can be calculated as $$d_{i,j}^2 = \|x_i - x_j\|^2, \quad \text{Eq. (8)}$$

in which the operator $\|\cdot\|$ denotes the Euclidean norm.

The Euclidean distance matrix (EDM) of the points set can be denoted by $D \in \mathbb{R}^{n \times n}$, where the elements are squared distances among the points, such that $D_{i,j} = d_{i,j}^2$. Note that the EDM is symmetric with zeros in the main diagonal.

As known in the art, the EDM matrix D can be calculated as:

$$D = \mathcal{K}(X^T X) = e\,\text{diag}(X^T X)^T - 2X^T X + \text{diag}(X^T X)e^T, \quad \text{Eq. (9)}$$

in which:

$\mathcal{K}(\cdot)$ denotes the operation of computing the EDM with provided operand;

$e \in \mathbb{R}^{n \times 1}$ denotes the column vector of all ones; and diag(A) is a column vector of the diagonal entries of matrix A.

The Gram matrix can be denoted by $G_{n \times n} = X^T X$. As a result, the calculation in Equation (9) can be rewritten as:

$$D = \mathcal{K}(G) = e\,\text{diag}(G)^T - 2G + \text{diag}(G)e^T. \quad \text{Eq. (10)}$$

Reconstruction of a Feasible Points Set

The problem of reconstructing the best point set representation of a given set of distances is known as multidimensional scaling (MDS). When D is known or measured (for example, in the illustrated example, D is estimated inter-node distances determined at block 205), we can recover the Gram matrix G as follows.

$$G = -\frac{1}{2}(D - e d_1^T - d_1 e^T), \quad \text{Eq. (11)}$$

where $d_1$ is the first column of D.

A feasible (not necessarily original) points set can then be recovered from the recovered Gram matrix G by an eigenvalue decomposition (EVD). In such a case, the Gram matrix can be written as $$G_{n \times n} = U_{n \times n} \Lambda_{n \times n} U_{n \times n}^T, \quad \text{Eq. (12)}$$

where $$\Lambda_{n \times n} = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_n \end{bmatrix} = \text{diag}(\lambda_1, \lambda_2, \ldots, \lambda_n), \quad \text{Eq. (13)}$$

(The operator diag(•) is overloaded to represent a diagonal matrix constructed with the elements of the operand vector on the main diagonal). With all eigenvalue $\lambda_i$'s non-negative, $|\lambda_1| \geq |\lambda_1| \geq \ldots \geq |\lambda_n|$, and U orthonormal since G is symmetric positive semidefinite (a symmetric matrix A whose eigenvalues are positive is called positive definite, and when the eigenvalues are just nonnegative, A is said to be positive semidefinite).

The estimated feasible points set can then be found as $$\hat{X}_{d \times n} = [\text{diag}(\sqrt{\lambda_1}, \ldots, \sqrt{\lambda_d}), 0_{d \times (n-d)}]_{d \times n} U_{n \times n}^T \quad \text{Eq. (14)}$$

Note trailing eigenvalues are truncated in Equation (14) because only d number of non-zero eigenvalues are expected in a d-dimensional points set.

It can then be verified that the reconstructed points set $\hat{X}$ generates the same EDM D using Equation (9).

Note that in the case of noise being present in the measured EDM, truncating the trailing eigenvalues will have de-noising effects. Highly noisy EDMs and/or missing entries in EDMs are addressed below.

In other examples, the point set of node locations may be reconstructed using a geometric centering matrix. In particular, the Gram matrix may be recovered using Equation (15) as opposed to the method in Equation (11):

$$G_{n \times n} = -\frac{1}{2} J_{n \times n} D_{n \times n} J_{n \times n}, \qquad \text{Eq. (15)}$$

where a geometric centering matrix, also known in the art as a centering matrix, is defined as shown in Equation 16:

$$J_{n \times n} = I_{n \times n} - \frac{1}{n} e_{n \times n} e_{n \times n}^T. \qquad \text{Eq. (16)}$$

Example Implementation of Block 209—Recovering Absolute Position and Orientation As noted above, determining a feasible point set of the nodes in block 207 with an EDM provides relative position information but not absolute position information. In one example, anchor coordinates, for example, anchor coordinates stored in anchor location database 134, can be used to recover the absolute position and orientation of the nodes. In one example, a node position calculation application may include instructions for recovering absolute positon and orientation by applying a statistical shape analysis. In one example, the instructions may include a two step process referred to in the art as a Procrustes analysis.

$Y \in \mathbb{R}^{d \times m}$ is the matrix representing the collection of coordinates of m number of anchor nodes, with m<n. Let $X_a \in \mathbb{R}^{d \times m}$ denote the sub-matrix (a selection of columns) of X that should be aligned with the anchors in Y.

In a first step, the row means are removed from $X_a$ and Y to obtain $X'_a$ and Y', respectively. In particular, $X'_a X_a - \bar{x}_a e_{m \times 1}^T = X_a J_{m \times m}$ and $Y'Y - \bar{y} e_{m \times 1}^T = Y J_{m \times m}$, where $J_{m \times m}$ iS a geometric centering matrix of size m×m, $\bar{x}_a \in \mathbb{R}^{d \times 1}$ and $\bar{y} \in \mathbb{R}^{d \times 1}$ denote the vector of row means of $X_a$ and Y, respectively.

In the second step, referred to in the art as the orthogonal Procrustes analysis, a search for the rotation and reflection that best maps $X'_a$ to Y', is performed, as shown in Equation (17).

$$R_{d \times d} = \underset{Q}{\operatorname{argmin}} \|Q_{d \times d} X'_a - Y'\|_F^2, \text{ s.t. } QQ^T = I_{d \times d}, \qquad \text{Eq. (17)}$$

where $Q_{d \times d}$ is an orthogonal matrix and the operator $$\|A_{n \times m}\|_F = \sqrt{\sum_{i=1}^{n} \sum_{j=1}^{m} |a_{i,j}|^2}$$

denotes the Frobenius norm of the matrix $A_{n \times m}$.

As known in the art, the solution to Equation (17) is given by the singular value decomposition (SVD) of the product $X'_a Y'^T$. In particular, let $U_{d \times d} \Sigma_{d \times d} V_{d \times d}^T = X'_a Y'^T$, where matrices U and V are orthonormal, and matrix $\Sigma = \operatorname{diag}(\sigma_1, \ldots, \sigma_d)$ is a diagonal matrix with non-negative singular values on its main diagonal, and the optimization in Equation (17) can be written as:

$$\begin{aligned} R &= \underset{Q}{\operatorname{argmin}}(\|QX'_a\|_F^2 + \|Y'\|_F^2 - 2\operatorname{tr}(Y'^T Q X'_a)) \qquad \text{Eq. (18)} \\ &= \underset{Q}{\operatorname{argmin}}(-2\operatorname{tr}(Y'^T Q X'_a)) \\ &= \underset{Q}{\operatorname{argmin}} \operatorname{tr}(Y'^T Q X'_a) \\ &= \underset{Q}{\operatorname{argmin}} \operatorname{tr}(Q X'_a Y'^T) \\ &= \underset{Q}{\operatorname{argmin}} \operatorname{tr}\left(Q U \sum V^T\right) \\ &= \underset{Q}{\operatorname{argmin}} \operatorname{tr}\left(V^T Q U \sum\right) \\ &= \underset{Q}{\operatorname{argmin}} \operatorname{tr}\left(\tilde{Q} \sum\right), \end{aligned}$$

s.t. $QQ^T = I$, where we define matrix $\tilde{Q} V^T Q U$, and tr(•) denotes the matrix trace operation. Note that in Equation 18 the orthogonal invariance of the Frobenius norm and the cyclic invariance of trace properties is used. Note that tr $$\left(\tilde{Q} \sum\right) = \sum_{i=1}^{d} \tilde{q}_{ii} \sigma_i.$$

Since the matrices U and V are orthogonal, $\tilde{Q}$ is also orthogonal, its diagonal entries cannot exceed 1, the maximum is achieved when $\tilde{q}_{ii}=1$, $\forall i \forall \{1, \ldots, d\}$, or equivalently $V^T Q U = I$. Thus, $R = Q = VIU^T = VU^T$ would be the solution to the optimization problem in Equation (17).

The final reconstructed set of node coordinate locations can then be found as:

$$\hat{X}^*_{d \times n} = R_{d \times d}(\hat{X}_{d \times n} - \bar{X}_a e_{n \times 1}^T) + \bar{Y} e_{n \times 1}^T. \qquad \text{Eq. (19)}$$

Algorithms for Noisy and Missing Measurements

As noted above, in practice, distance measurements made by nodes may be noisy and there could be missing entries in a measured EDM, e.g., an EDM generated in block 207. In such cases, directly calculating absolute node locations by performing a node point set reconstruction can be challenging. In one example, the semidefinite relaxation algorithm introduced in I. Dokmanic, R. Parhizkar, J. Ranieri, and M. Vetterli, "Euclidean distance matrices: Essential theory, algorithms, and applications," IEEE Signal Processing Magazine, vol. 32, no. 6, pp. 12-30, 11 2015, which is incorporated by reference herein in its entirety, may be used. Main aspects of a semidefinite relaxation algorithm that may be applied are summarised here.

A matrix $D_{n \times n}$ is an EDM if and only if the corresponding geometrically centered Gram matrix $$G = -\frac{1}{2} JDJ$$

is positive semmennite (thus symmetric according to the definition of positive semidefinite matrices), where the matrix J is defined in Equation (16). As a result, it establishes a one-to-one correspondence between the cone of valid EDMs, denoted by $\mathbb{EDM}^n$, and the intersection of the symmetric positive semidefinite cone $\mathbb{S}_+^n$ with the geometrically centered cone $\mathbb{S}_c^n$. (Note that a subset $\mathcal{C}$ of a vector space $\mathcal{V}$ is a cone (or sometimes called a linear cone) if for each $x \in \mathcal{C}$ and any non-negative scalars $\alpha \geq 0$, the product $\alpha x \in \mathcal{C}$. Note also that the set of all symmetric positive semidefinite matrices of particular dimension is called the positive semidefinite cone. And that the set of all symmetric matrices whose column sum vanishes is defined as the geometrically centered cone.)

Using mathematical notations, we may write $$\mathbb{S}_+^n = \{G \in \mathbb{R}^{n \times n} | G \geq 0\}, \qquad \text{Eq. (20)}$$

$$\mathbb{S}_c^n = \{G \in \mathbb{R}^{n \times n} | G = G^T, Ge = 0\}. \qquad \text{Eq. (21)}$$

Using this one-to-one correspondence, an EDM completion and approximation may be performed as semidefinite programming over Gram matrices. Moreover, since the affine dimension of $X \in \mathbb{R}^{d \times n}$ is at most d, with the knowledge of rank(J) and the rank properties of Gram matrices, we can show that the rank of the Gram matrix rank(G)$\leq$d. (Note the affine dimension is the dimension of the smallest affine subspace that contains the set of points.) As a result, the following rank-constrained semidefinite programming for solving the points set reconstruction problem can be used:

$$\min_G \|W \circ (\tilde{D} - \mathcal{K}(G))\|_F^2, \qquad \text{Eq. (22)}$$

subject to rank(G)$\leq$d $$G \in \mathbb{S}_+^n \cap \mathbb{S}_c^n,$$

where the matrix W is defined as the masking matrix with ones for observed entries and zeros otherwise and the matrix $\tilde{D}$ denotes the observed EDM. The goal is to find the Gram matrix G which would generate a valid EDM closest to the observed EDM, omitting the unobserved entries.

However, the rank constraint makes the feasible set in Equation (22) non-convex. Finding the solution becomes difficult. In one example, the rank constraint may be omitted to relax the problem to more easily obtain a solution with the correct dimensionality.

$$\min_G \|W \circ (\tilde{D} - \mathcal{K}(G))\|_F^2, \qquad \text{Eq. (23)}$$

subject to $G \in \mathbb{S}_+^n \cap \mathbb{S}_c^n$

Along with other considerations, including avoiding numerical problems in practice, in one example, the implementation in Equation (24) may be used to solve the problem.

$$\max_H tr(H) - \lambda \|W \circ (\tilde{D} - \mathcal{K}(VHV^T))\|_F^2, \qquad \text{Eq. (24)}$$

subject to $H \in \mathbb{S}_+^{n-1}$, where $H \in \mathbb{R}^{(n-1) \times (n-1)}$ a positive semidefinite Gram matrix with reduced dimensions, and $$V_{n \times (n-1)} = \begin{bmatrix} p & p & \cdots & p \\ 1+q & q & \cdots & q \\ q & 1+q & \cdots & q \\ \vdots & \vdots & \ddots & \vdots \\ q & q & \cdots & 1+q \end{bmatrix}_{n \times (n-1)}, \qquad \text{Eq. (25)}$$

with $$p = -\frac{1}{\sqrt{n}} \text{ and } \frac{1}{n + \sqrt{n}},$$

such that $$V^T e = 0, VV^T = I - \frac{1}{n} ee^T = J_{n \times n}$$

and $V^T V = I_{(n-1) \times (n-1)}$. Note that $G^* = VH^*V^T$ is the positive semidefinite Gram matrix of size n×n that we seek for, where H* is the solution in Equation (24). To obtain the reconstructed points set of actual node locations, Equations (14) and (19) may be used.

Example Implementation of Blocks 211-217—Assigning Node IDs and Estimating Errors As noted above, in one example, node position calculation application 136 may include instructions for applying the Hungarian algorithm to compare the calculated node location coordinates determined in block 209 to installation plan 132 and assign node IDs to the node location coordinates in the installation plan. The Hungarian algorithm solves the linear sum assignment problem which is also known as minimum weight matching in bipartite graphs. A problem instance is described by a matrix $C \in \mathbb{R}^{n \times n}$, where each entry $C_{i,j}$ is the cost of matching vertex i of the first partite set ("workers") and vertex j of the second set ("jobs"). See, e.g., H. W. Kuhn and B. Yaw, "The hungarian method for the assignment problem," Naval Research Logistics Quarterly, pp. 83-97, 1955. The goal is to find a complete one-to-one assignment of workers to jobs of minimal total cost. The assignment matrix may be denoted as $A \in \mathbb{R}^{n \times n}$. The assignment matrix in this example is a boolean matrix where $A_{i,j} = 1$ if and only if row i is assigned to column j. The optimal assignment has cost:

$$\min_A \sum_i \sum_j C_{i,j} A_{i,j}, \qquad \text{Eq. (26)}$$

subject to $Ae = e$ and $e^T A = e^T$.

In the illustrated example, each node 102 can be viewed as a "worker" and each possible location in the installation plan 132 can be viewed as a "job". The cost of matching a node to a possible location can be defined as the squared distances between the estimated radio node location to a possible location in the blueprint. In this fashion, the optimization problem in Equation (26) can then be linked to finding the minimum mean square error (MMSE). Note that, alternatively, the Hungarian algorithm can be applied only to the subset of nodes excluding the anchor nodes.

Once the optimal assignment matrix $A^*=\arg\min_A \Sigma_i \Sigma_j C_{i,j} A_{i,j}$ is found, the final commissioning result $X_{com} \in \mathbb{R}^{d \times n}$ can be computed as $$X_{com} = X_b A^*, \quad \text{Eq. (27)}$$

where $X_b \in \mathbb{R}^{d \times n}$ is the installation plan containing the coordinates of all possible node locations, and where the final commissioning result contains all of the calculated estimated locations of each node.

Example Implementation of Block 217—Reprojection Error and Commissioning Error Predictions Due to noisy measurements and possible missing measurements when radio nodes are out of communication range with each other, commissioning errors are expected in $X_{com}$. On the other hand, when the number of nodes is large, for example, greater than 20 and the nodes are relatively densely installed, the inventors have observed minimal commissioning errors during simulation and lab tests. Node position calculation application 136 may include instructions for calculating one or more error metrics. For example, once the final commissioning result $X_{com}$ is obtained, the node position calculation application may include instructions for calculating the corresponding "reprojected" EDM $D_{com} \in \mathbb{R}^{n \times n}$ using, e.g., Equation (9), in other words, a reprojected EDM of the final commissioning result. For example, in instances where an installation plan is available, an EDM of the installation plan that has been augmented to include assignments of node IDs may be created, referred to herein as a reprojected EDM. In cases where an installation plan is not available, an EDM of the final calculation of node location coordinates can be created.

Then, a reprojection error vector $w \in \mathbb{R}^{n \times 1}$ can be defined as:

$$w = f_s(\tilde{D} - D_{com})\frac{1}{n-1}e_{n \times 1}, \quad \text{Eq. (28)}$$

where the function $f_s$ defined as $f_s(A) = A \circ A$ denotes the operation to return element-wise square valued matrix of the argument matrix, where sign "$\circ$" indicates Hadamard or element-wise product of matrices.

Note that each of the elements in the reprojection error vector w indicates the average squared distance discrepancies from the corresponding radio node to other radio nodes, between the observed and "reprojected" EDMs. From experiments, the inventors have observed that the value of an element in w is not necessarily related to commissioning errors. Instead, errors are more indicative from inconsistencies of the values in w in the installation arrangement. For example, if a given one node 102_i has a significantly higher reprojection error value in w compared to its neighbors, then it is more likely that the particular node is more likely commissioned wrong. Thus, node position calculation application 136 may include instructions for finding the set of each node's neighbors according to the final commissioning result. In one example, the criterion used to define neighbors can be based on a pre-determined radius. In one example, a maximum value of absolute differences in corresponding reprojection errors can be calculated as a metric for predicting which nodes are more likely to have been commissioned incorrectly as compared to other radio nodes.

In particular, a vector $p = [p_1, p_2, \ldots, p_n]^T$ may be defined as an error prediction metric, where:

$$p_i = \max_j |w_i - w_j|, \forall j \in \mathcal{N}_i, \quad \text{Eq. (29)}$$

and $\mathcal{N}_i$ denotes the set of neighbor nodes of the i-th node 102. From simulations and real network tests, the inventors have observed that higher $p_i$ values are often found for those radio nodes commissioned wrong.

In many cases, commissioning errors happen to closely located nodes. Thus, node position calculation application 136 may include instructions for identifying a subset of nodes proximate a node with a high error prediction as having a likely commissioning measurement error that should be checked by some other measurement technique, e.g., manually.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 3:
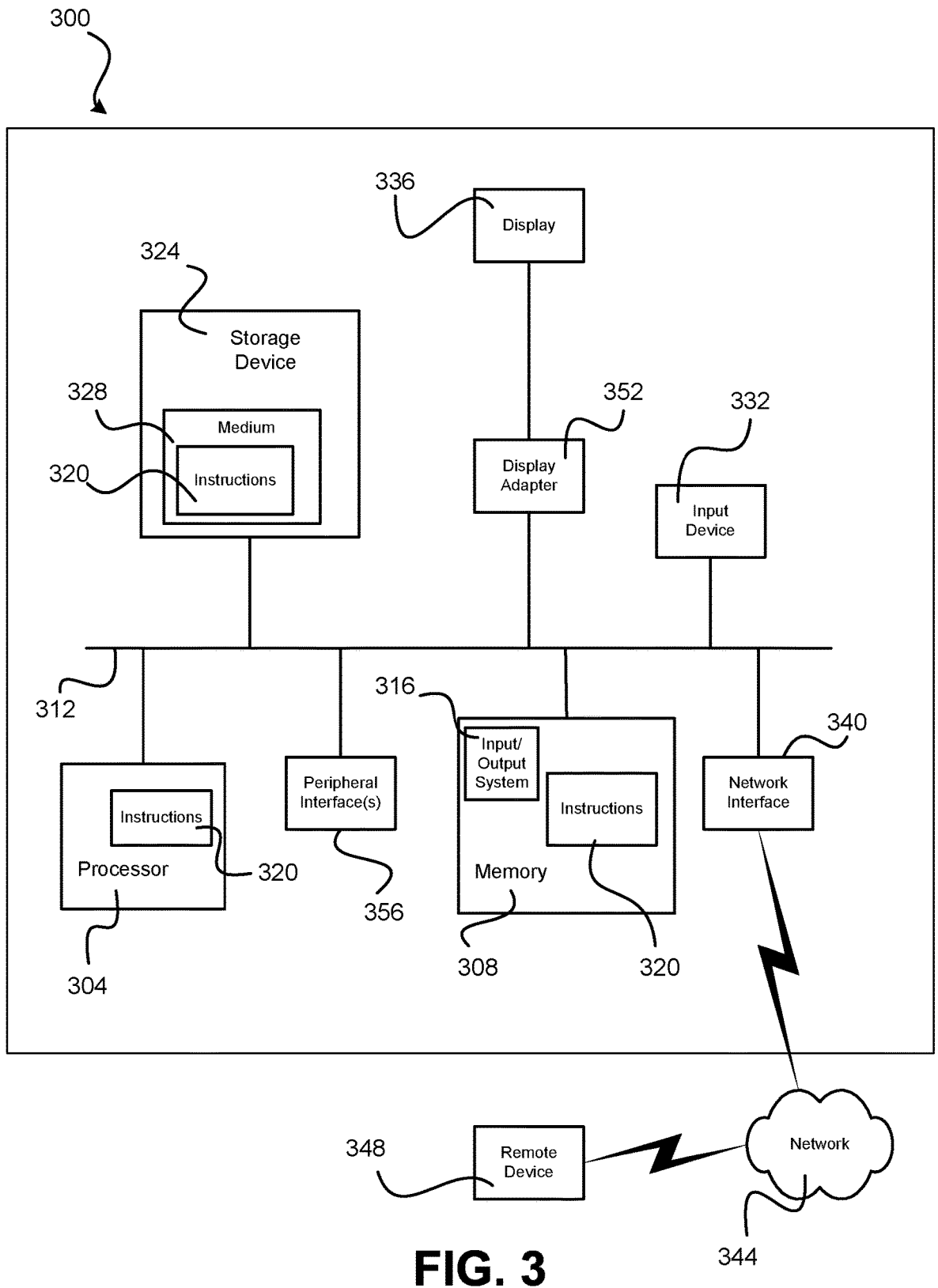
FIG. 3 is a functional block diagram of an example computing device.

FIG. 3 shows a diagrammatic representation of one embodiment of a computing device in the exemplary form of a computer system 300 within which a set of instructions for causing one or more components of a system, such as system 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 300 includes a processor 304 and a memory 308 that communicate with each other, and with other components, via a bus 312. Bus 312 may include any of several types of bus structures including, but not limited to, a memory bus, a memory controller, a peripheral bus, a local bus, and any combinations thereof, using any of a variety of bus architectures.

Memory 308 may include various components (e.g., machine-readable media) including, but not limited to, a random access memory component, a read only component, and any combinations thereof. In one example, a basic input/output system 316 (BIOS), including basic routines that help to transfer information between elements within computer system 300, such as during start-up, may be stored in memory 308. Memory 308 may also include (e.g., stored on one or more machine-readable media) instructions (e.g., software) 320 embodying any one or more of the aspects and/or methodologies of the present disclosure. In another example, memory 308 may further include any number of program modules including, but not limited to, an operating system, one or more application programs, other program modules, program data, and any combinations thereof.

Computer system 300 may also include a storage device 324. Examples of a storage device (e.g., storage device 324) include, but are not limited to, a hard disk drive, a magnetic disk drive, an optical disc drive in combination with an optical medium, a solid-state memory device, and any combinations thereof. Storage device 324 may be connected to bus 312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 324 (or one or more components thereof) may be removably interfaced with computer system 300 (e.g., via an external port connector (not shown)). Particularly, storage device 324 and an associated machine-readable medium 328 may provide nonvolatile and/or volatile storage of machine-readable instructions, data structures, program modules, and/or other data for computer system 300. In one example, software 320 may reside, completely or partially, within machine-readable medium 328. In another example, software 320 may reside, completely or partially, within processor 304.

Computer system 300 may also include an input device 332. In one example, a user of computer system 300 may enter commands and/or other information into computer system 300 via input device 332. Examples of an input device 332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 332 may be interfaced to bus 312 via any of a variety of interfaces (not shown) including, but not limited to, a serial interface, a parallel interface, a game port, a USB interface, a FIREWIRE interface, a direct interface to bus 312, and any combinations thereof. Input device 332 may include a touch screen interface that may be a part of or separate from display 336, discussed further below. Input device 332 may be utilized as a user selection device for selecting one or more graphical representations in a graphical interface as described above.

A user may also input commands and/or other information to computer system 300 via storage device 324 (e.g., a removable disk drive, a flash drive, etc.) and/or network interface device 340. A network interface device, such as network interface device 340, may be utilized for connecting computer system 300 to one or more of a variety of networks, such as network 344, and one or more remote devices 348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 320, etc.) may be communicated to and/or from computer system 300 via network interface device 340.

Computer system 300 may further include a video display adapter 352 for communicating a displayable image to a display device, such as display device 336. Examples of a display device include, but are not limited to, a liquid crystal display (LCD), a cathode ray tube (CRT), a plasma display, a light emitting diode (LED) display, and any combinations thereof. Display adapter 352 and display device 336 may be utilized in combination with processor 304 to provide graphical representations of aspects of the present disclosure. In addition to a display device, computer system 300 may include one or more other peripheral output devices including, but not limited to, an audio speaker, a printer, and any combinations thereof. Such peripheral output devices may be connected to bus 312 via a peripheral interface 356. Examples of a peripheral interface include, but are not limited to, a serial port, a USB connection, a FIREWIRE connection, a parallel connection, and any combinations thereof.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure. It will be understood by those skilled in the art that various changes, omissions and additions may be made to that which is specifically disclosed herein without departing from the spirit and scope of the present disclosure.

What is claimed is:

1. A method of commissioning a plurality of nodes in a wireless network, comprising:
   receiving, from the plurality of nodes, inter-node distance measurements that include node identification information (ID) and values corresponding to distances between pairs of the nodes;
   determining, by a processor, relative positions of the plurality of nodes based on the inter-node distance measurements;
   receiving anchor node location coordinates for a plurality of anchor nodes, wherein the plurality of anchor nodes are a subset of the plurality of nodes;
   calculating, by the processor, location coordinates for the plurality of nodes based on the relative positions of the plurality of nodes and the anchor node location coordinates, wherein each calculated location coordinate is associated with a different node ID;
   receiving an installation plan that includes actual location coordinates of the plurality of nodes;
   assigning, by the processor, for each actual location coordinate, the node ID that is associated with a calculated location coordinate that is closest to the actual location coordinate;
   iterating, by the processor, the determining, calculating, and assigning steps to determine a plurality of assignments of the node IDs to the actual location coordinates;
   selecting, by the processor, for each actual location coordinate, the node ID that was most frequently assigned to the actual location coordinate across the plurality of assignments; and
   generating, by the processor, an error value for each node ID based on a number of iterations that are in agreement with the selection.

2. The method of claim 1, wherein the assigning step includes executing at least one combinatorial optimization algorithm.

3. The method of claim 1, wherein the iterating step stops based on at least one of:
   a predetermined maximum number of iterations; and
   a predetermined percentage of node ID assignments in one of the plurality of assignments are in agreement for a predetermined minimum number of iterations.

4. The method of claim 1, wherein selecting, for each actual location coordinate, the node ID comprises:
   executing, by the processor, at least one combinatorial optimization algorithm to resolve conflicts in the plurality of assignments.

5. The method of claim 1, wherein determining the relative positions of the plurality of nodes comprises calculating, by the processor, inter-node distances from the inter-node distance measurements and creating a Euclidean distance matrix (EDM) from the calculated inter-node distances.

6. The method of claim 5, wherein calculating the location coordinates for each of the plurality of nodes comprises:
   reconstructing, by the processor, the location coordinates from the EDM by determining at least one scaling factor from the anchor node location coordinates and applying the at least one scaling factor to the EDM.

7. The method of claim 1, the method further comprising:
   calculating, by the processor, a reprojected EDM from the actual location coordinates augmented with the assignment of node IDs;
   comparing, by the processor, the EDM to the reprojected EDM; and
   calculating, by the processor, the error values for each node ID from the comparison of the EDM to the reprojected EDM.

8. The method of claim 1, wherein the inter-node distance measurements are received signal strength indicator (RSSI) values from wireless messages exchanged between pairs of the nodes.

9. The method of claim 8, further comprising:
   executing, by the processor, a signal path loss model to calculate estimated inter-node distances from the inter-node distance measurements.

10. The method of claim 1, wherein the plurality of nodes include a plurality of luminaires each having a communication module configured for inter-luminaire wireless communication.

11. A computing device, comprising:
    a communications module configured to receive, from a plurality of nodes of a wireless network, inter-node distance measurements that include node identification information (ID) and values corresponding to distances between pairs of the nodes; and
    a processor coupled to the communications module and configured to:
    determine relative positions of the plurality of nodes based on the inter-node distance measurements;
    receive anchor node location coordinates for a plurality of anchor nodes, wherein the plurality of anchor nodes are a subset of the plurality of nodes;
    calculate location coordinates for the plurality of nodes based on the relative positions of the plurality of nodes and the anchor node location coordinates, wherein each calculated location coordinate is associated with a different node ID;
    receive an installation plan that includes actual location coordinates of the plurality of nodes;
    assign, for each actual location coordinate, the node ID that is associated with a calculated location coordinate that is closest to the actual location coordinate;
    iterate the determining, calculating, and assigning steps to determine a plurality of assignments of the node IDs to the actual location coordinates;

select, for each actual location coordinate, the node ID that was most frequently assigned to the actual location coordinate across the plurality of assignments; and generate an error value for each node ID based on a number of iterations that are in agreement with the selection.

12. The computing device of claim 11, wherein the processor is configured to assign node IDs by executing at least one combinatorial optimization algorithm.

13. The computing device of claim 11, wherein the processor is further configured to stop iterating based on at least one of:

a predetermined maximum number of iterations; and a predetermined percentage of node ID assignments in one of the plurality of assignments are in agreement for a predetermined minimum number of iterations.

14. The computing device of claim 11, wherein the processor is configured to execute at least one combinatorial optimization algorithm to resolve conflicts in the plurality of assignments.

15. The computing device of claim 11, wherein determining the relative positions of the plurality of nodes comprises calculating inter-node distances from the inter-node distance measurements and creating a Euclidean distance matrix (EDM) from the calculated inter-node distances.

16. The computing device of claim 15, wherein calculating the location coordinates for each of the plurality of nodes comprises reconstructing the location coordinates from the EDM by determining at least one scaling factor from the anchor node location coordinates and applying the at least one scaling factor to the EDM.

17. The computing device of claim 11, wherein the processor is further configured to:

calculate a reprojected EDM from the actual location coordinates augmented with the assignment of node IDs;

compare the EDM to the reprojected EDM; and calculate the error value of the node IDs from the comparison of the EDM to the reprojected EDM.

18. The computing device of claim 11, wherein the inter-node distance measurements are received signal strength indicator (RSSI) values from wireless messages exchanged between pairs of the nodes.

19. The computing device of claim 18, wherein the processor is further configured to execute a signal path loss model to calculate estimated inter-node distances from the inter-node distance measurements.

20. The computing device of claim 11, wherein the plurality of nodes include a plurality of luminaires each having a communication module configured for inter-luminaire wireless communication.

* * * * *